Jan. 2, 1934.          R. W. CANFIELD          1,941,878
SUCTION GATHERING BOTTLE MACHINE WITH OVERLAPPING CYCLES
Filed Feb. 20, 1929          2 Sheets-Sheet 1

Witness:
J. J. Grotta

Inventor:
Robert W. Canfield
by Robert D. Brown
Attorney.

Patented Jan. 2, 1934

1,941,878

UNITED STATES PATENT OFFICE 1,941,878

SUCTION GATHERING BOTTLE MACHINE WITH OVERLAPPING CYCLES

Robert W. Canfield, West Hartford, Conn., assignor to Hartford-Empire Company, Hartford, Conn., a corporation of Delaware Application February 20, 1929. Serial No. 341,384

7 Claims. (Cl. 49—5)

My invention relates to the art of making glassware, particularly bottles, by the suction gathering method. It constitutes an improvement on the machine shown in the United States patent to A. S. Reichel, 1,020,222.

The aforesaid Reichel patent discloses a continuously rotating suction gathering bottle machine provided with a table, or spider, upon which is mounted a plurality of parison mold units each comprising a suction parison mold, a neck ring, and a combined suction and blow head and a plurality of blow mold units associated therewith. The parison mold, the neck ring and the head on each unit are mounted upon a suitable carriage which, during a part of the rotation of the table, is tilted from the horizontal to carry the lower end of the suction mold into a bath of glass to effect the gathering of the mold charge. This carriage carries a normally vertical pivot about which the parison mold, neck ring and head may be oscillated in order that these parts may be projected to gather the glass and thereafter move to a position to transfer a parison to the associated blow mold. In the Reichel machine, the formation of the parison is accomplished through the sucking operation alone, the machine providing no means for positively forming the parison by blowing against a bottom plate or mold. In the cycle of the Reichel machine, the gathering is accomplished as the parison mold passes over and dips into a bath of glass. The mold is then lifted and the glass connecting that in the mold with the supply is severed by a suitable shear. Thereupon and while the table rotates through approximately 90°, the parison mold is moved about its horizontal pivot, the parison mold is opened and the parison is transferred to the blow mold. The parison is blown to final form while the table rotates through approximately 130° and is retained in the blow mold while the table rotates through an additional 75°, more or less, or until the unit reaches a position just short of the beginning of the gathering operation.

In the Reichel machine, the combined suction and blow head is adapted to coact with the parison suction mold during the gathering operation and to thereafter register with the blow mold to blow the parison to final form. It is thus apparent that with the Reichel arrangement and cycle, the blow mold must be idle during the period of gathering and the setting of the gathered glass into parison form in the parison mold and that the parison mold must be idle at all other times in the cycle of the operation.

As a definite minimum of time is necessary for the setting of the glass in the parison mold, and also for the blowing and setting of the bottle in the blow mold, and as the same head in the Reichel machine must successively operate with the molds of its unit, very definite limitations are placed upon the speed of the Reichel machine.

Also it is desirable, in order to make better parisons which result in a finer quality of glassware, to provide for the positive formation of the parison by forcing the glass in the parison mold into intimate contact with a complete mold surface.

The principal object of my improvement is to provide a machine similar to the Reichel machine, but having what may be termed overlapping cycles of operation of the parison mold and its associated blow mold, whereby the device may be more efficiently operated to produce a greater quantity of ware in a given time.

A further object of the invention is to provide for the movement of the parison mold to a position intermediate those at which the glass is gathered and the parison transferred to the blow mold, at which intermediate position the parison mold is associated with a suitable bottom plate, or bottom mold, which together with the parison mold forms a complete mold surface against which the parison is blown or otherwise positively formed.

A further object of the invention is to provide a means independent of the combined suction and blow head for blowing the parisons to final form in the blow mold.

Other objects and advantages of my invention will appear from the following specification and claims, when considered in connection with the accompanying drawings, in which:

Figures 1, 2:
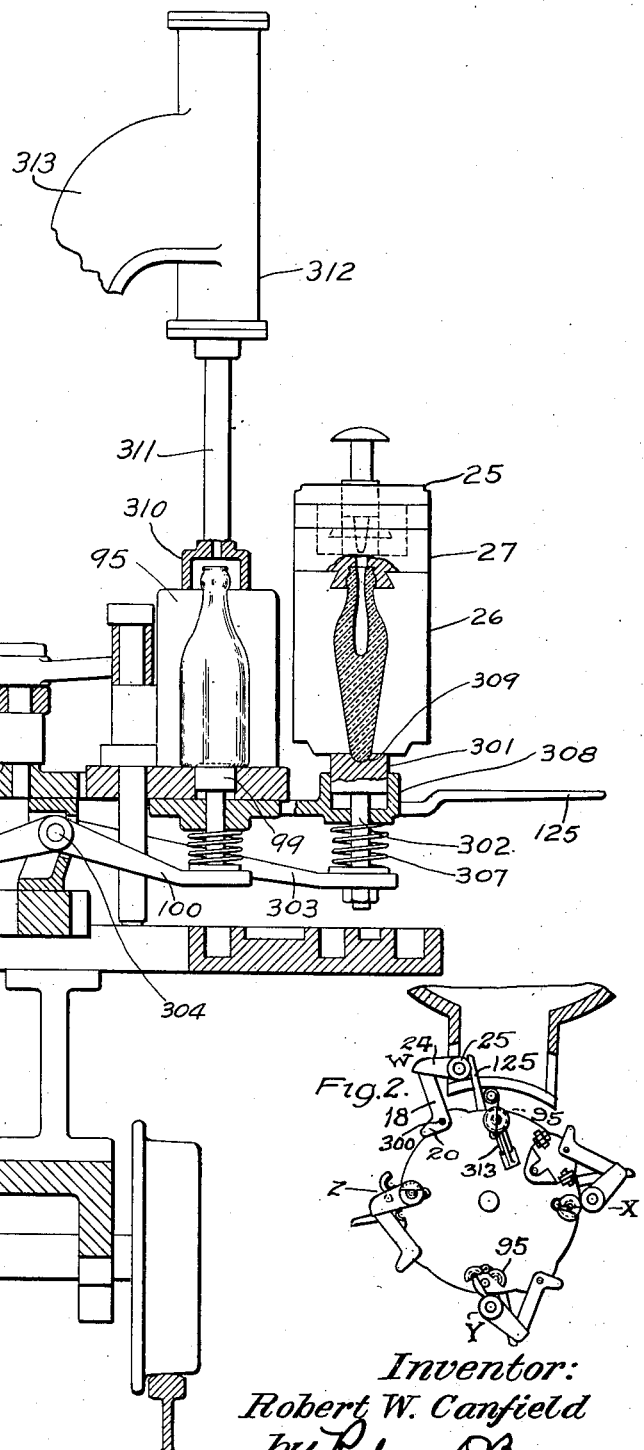
Figure 1 is a fragmentary vertical section of one of the units of a machine embodying my invention, but omitting for clearness, certain parts which exist in the Reichel patent or are otherwise well known in the art.
Fig. 2 is a diagrammatic plan view of a machine embodying my invention but omitting the details of the operating mechanism.

Generally speaking, the embodiment of my present invention comprises a machine which in most respects is like the machine of the aforesaid Reichel Patent 1,020,222. It includes a plurality of units, each including the parison mold 26, neck ring 27 and suction and blow head 25 mounted upon a carrier 24 which is mounted on and offset to an arm 18. As in the Reichel patented machine, this mechanism is provided with means for dipping the combined head, neck ring and mold at suitable times to gather a glass charge, and also with means for swinging these parts about a fixed pivot to a transfer position. These latter means are also substantially the same as those shown in the Reichel patent. These parts differ from the Reichel machine in that the cam which governs the swinging of the head about the pivot 300 is of such contour as to swing the parts to an additional intermediate position between the gathering position and the transfer position over an additionally provided bottom mold or plate 301 which is mounted on a rod 302 to which is connected a lever 303 pivoted as at 304 and bearing on its inner end a cam roll 305 adapted to run on a stationary cam 306. A spring 307 surrounds the rod 302 between the lever and the casing 308 of the bottom plate. This spring tends to hold the bottom plate 301 in its lower position and to hold the cam roll 305 against its cam. When the parison mold 26 is swung to the position over the plate 301, the cam 306 causes the upward movement of the bottom plate 301 to force that plate into capping relation with the bottom of the mold, and to cause a cavity 309 in the bottom plate to register with the cavity in the mold 26 to complete the mold cavity. This additional position, at which the mold and bottom plate are in cooperating relation, is the position at which the parison is formed by blowing and is the position indicated in Fig. 1 and at X in Fig. 2.

The blow mold mechanism and its mounting, as shown in the drawings, are substantially the same as disclosed in the Reichel patent. The parts relating to the blow mold and its mounting have been given the same numerals as the similar parts shown in the Reichel patent. In addition to the parts shown by Reichel, I have provided a final blow head 310 mounted on a piston rod 311 of a piston working in a cylinder 312 carried by a bracket 313 which is suitably mounted upon the rotating table 11. The details of the blow head are not shown as the present invention does not reside in these details, and because such blow heads are well known in the art. The head, however, is operated by suitable mechanism to cap the blow mold containing the parison at suitable times. The particular configuration of the blow head is such as to properly cover the finish of the parison as shown in Fig. 1. The head 310 is moved down by the piston 311 at the proper times into capping relation to the mold, whereupon blowing pressure is applied under suitable control by well known means (not shown) through the head to blow the parison to final form. The head may also be lifted to permit proper cooperation of the neck ring and associate parts with the blow mold to effect the transfer and to permit removal of the finished ware at the proper times.

It is the provision of these additional parts, namely, the blow head 310, of which there is one for each unit, and of the bottom plate 301 and of the variation in the cam controlling the swinging movements of the parison mold that permits the practice of the method of my invention, namely, the use of overlapping cycles of the parison mold and its associated blow mold, and hence the improved operation of the machine and the increase in its capacity.

In Fig. 2, I have diagrammatically illustrated the machine as comprising four units. At the position W, I have shown one of the units in the position at which its parison mold is being dipped at the beginning of its gathering operation, and at which the associated blow mold contains a parison. At this time, the blow head 310 is in position for blowing that parison to final form. At the position X, another unit is shown with its parison mold at the parison blowing or intermediate position at which the bottom plate caps the mold and during which the glass is being blown into parison form. The associated blow mold is there shown as still enclosing the previously formed parison, which is either being blown to final form or has been blown thereto and is acquiring the proper set. At the position Y, I have shown a third unit at a position in which the blowing is still continuing in the parison mold, but the associated blow mold is being opened to permit the removal of the bottle which has been formed from the previous parison. In the position Z, the fourth unit is shown, in which the parison mold is open and the neck ring is effecting the transfer of the parison to its associated blow mold. As there shown, the blow mold has completely closed about the parison while the neck ring is still closed.

Figure 3:
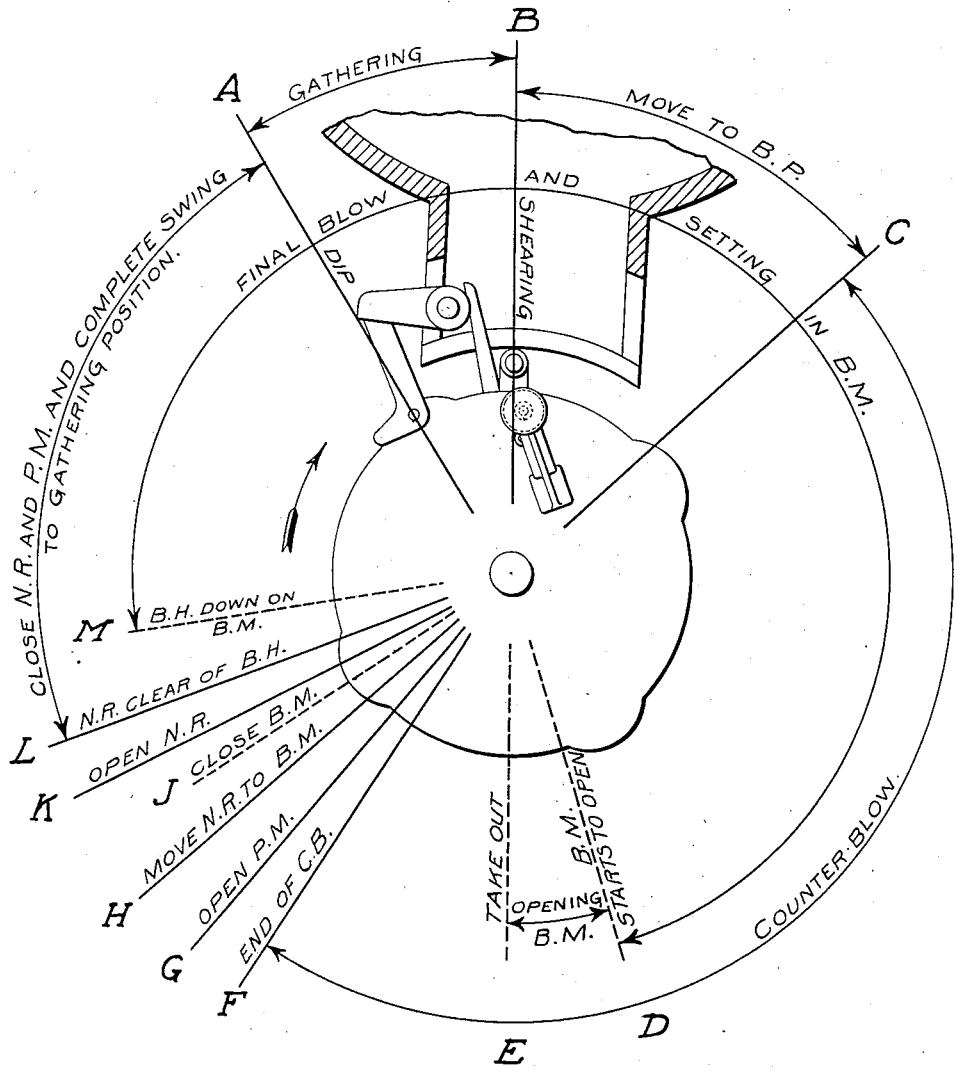
Fig. 3 is a diagram illustrating a preferred cycle of a machine of my invention.

In Fig. 3, a preferred form of operation of the machine is illustrated, this figure indicating the successive operations of a single unit as it continuously rotates about the center of the machine. It is to be understood that the invention is not limited to the precise sequence and extent of operations indicated by this diagram and that the various movements and operations may be made to take place at different times and for different periods without departing from my invention.

The cycles of operations indicated in Fig. 3 are as follows. At the position marked A, which corresponds closely to the position W of Fig. 2, the parison mold, neck ring and suction head are projected and dipped to gather the glass from the pot or furnace indicated at P. This gathering takes place as these parts pass from the position A to the position B, at which latter position the shearing takes place and the parison moves toward the intermediate position over the bottom plate. At the position C, the mold has arrived over the bottom plate and the bottom plate has been forced into capping relation with the bottom of the mold to complete the mold cavity. At this point, the parison blowing may begin, and this operation may continue as indicated to the point F. During this period, the air may be applied constantly or in intermittent puffs, or may be applied and then discontinued for a portion of this period while the blown parison sets to the proper extent in the parison mold. During most of the above described operations, the blow mold is closed about a parison previously formed in its associated parison mold, which parison is being blown by air applied through the blow head 310 and/or is setting in the parison mold. This final blowing, which started at the point M hereinafter mentioned, continues through the points A, B and C and until the unit arrives at the point D, at which the blow head is moved upwardly and the blow mold begins to open to permit the removal or takeout of the bottle, which is accomplished at or about the point E. From this point E to the point H, the blow mold remains open and may be cooled if desired. Meanwhile at the point F, the parison mold begins to open, leaving the parison suspended in the associated neck ring. The parison mold is completely open at the point G and the neck ring begins to move to the innermost or transfer position, carrying the parison between the halves of the blow mold, which movement is completed at H. The blow mold begins to close at this point and is closed about the parison at the point J, whereupon the neck ring begins to open and is opened at the point K and starts its movement outwardly toward the gathering position indicated at A. It is completely clear of the blow mold at the point L, whereupon the blow head 310 moves down to the blow mold into blowing position. The final blowing commences at the point M. From the point L to the point A, the parison mold and the neck ring move into their gathering positions in which both are closed and projected to their outermost position.

It is thus seen that I have provided a method and means by which a single table suction gathering machine, such for instance as that shown by Reichel, may be provided with suitable overlapping cycles of operation of its parison mold and blow mold of each unit, and I have provided for the preliminary blowing or positive forming of the parison as an operation distinct from the operations of gathering and shearing. These provisions not only provide for an increased production in the machine of my invention over and above that of the machine shown by Reichel and similar machines, but provides for a maintenance of the mold parts in an improved condition to perform their intended functions. These provisions result not only in the formation of finer quality glassware, but also permit a more rapid production thereof. A flexible control of the times and character of the final blowing operation is provided. This operation can be controlled within wide limits independently of the operation of the parison mold.

It is seen that I have provided for the cooling and positioning of the neck ring and parison mold, for the gathering of the charge in the parison mold, for movement of the parison mold to parison forming position, and for blowing the glass into a parison during the period of final blow of a previously formed parison in the associated blow mold, and that I have provided for the takeout and reconditioning of the blow mold parts during the blowing and/or setting operation of a succeeding parison.

It is obvious that my invention is not limited to the particular means shown and described for carrying out my invention, and that many modifications of the apparatus and numerous variations in the relationships of the operations may be made without departing from the spirit of my invention as set forth in the accompanying claims.

I claim:

1. Apparatus for forming articles of glassware which comprises a continuously rotating carriage, a suction parison mold and associated blow mold mounted thereon, a neck ring and a suction and blow head associated with said parison mold, and a blow head associated with said blow mold, means for projecting the parison mold, neck ring and suction and blow head to a position over a bath of glass to gather a charge of glass in the parison mold and neck ring, means for severing the glass, means for moving the parison mold, neck ring and head to a parison forming position, a bottom mold adapted to cooperate with the parison mold at the parison forming position, means for blowing the charge to form a parison, means for opening the parison mold, means for moving the neck ring to present the parison between the halves of the blow mold, means for closing the blow mold about the parison, means for opening the neck ring and moving the neck ring away from the blow mold, means for moving the blow head into capping relation with the blow mold and for applying blowing pressure therethrough to blow the parison to final form, and means for timing the several operations to provide that a parison may be both gathered and blown in the parison mold while a parison previously formed therein is being blown to final form in the associated blow mold.

2. Apparatus for forming articles of glassware which comprises a continuously rotating carriage, a suction parison mold and associated blow mold mounted thereon, a neck ring and a suction and blow head associated with said parison mold, a blow head associated with said blow mold, means for projecting the parison mold, neck ring, suction and blow head to a position adjacent a bath of glass to gather a charge of glass in the blow mold and neck ring, means for moving the parison mold, neck ring and head to a parison forming position, a bottom mold adapted at such position to cooperate with the parison mold, means for blowing the charge at such position to form a parison, means for opening the parison mold, means for moving the neck ring to place the parison between the halves of the blow mold, means for closing the blow mold about the parison, means for opening the neck ring and moving the neck ring away from the blow mold, means for moving the blow head into capping relation with the blow mold and for applying blowing pressure therethrough to blow the parison to final form, and means for timing the several operations to cause a charge to be blown into a parison, while the preceding parison is being blown to final form.

3. Apparatus for forming articles of glassware which comprises a continuously rotating carriage, a suction parison mold and associated blow mold mounted thereon, a neck ring and a suction and blow head associated with said parison mold, and a blow head associated with said blow mold, means for projecting the parison mold, neck ring, suction and blow head to a position adjacent a bath of glass to gather a charge of glass in the parison mold and neck ring, means for moving the parison mold, neck ring and suction and blow head to a parison forming position stationary with respect to the carriage, means operative at such position to cooperate with the parison mold for supporting the charge for blowing, means for blowing the charge at such position to form a parison, means for opening the parison mold, means for closing the blow mold about the parison, means for opening the neck ring and moving it away from the blow mold, means for moving the blow head into capping relation with the blow mold and for applying blowing pressure therethrough to blow the parison to final form, and means for timing the several operations so that a charge is being both gathered and blown in the parison mold while a preceding charge is being blown to final form in the associated blow mold.

4. Apparatus for forming articles of glassware which comprises a continuously rotating carriage, a suction parison mold and associated blow mold thereon, said blow mold being mounted on said carriage inwardly of the edge thereof, a bottom mold permanently mounted on said carriage for vertical alignment with the parison mold, said bottom mold being located between the finishing mold and the edge of the carriage, and means for reciprocating the bottom mold into and out of engagement with the parison mold.

5. Apparatus for forming articles of glassware which comprises a continuously rotating carriage, a suction parison mold, a blow mold mounted on said carriage and located inwardly of the edge thereof, a bottom mold permanently positioned on said carriage for vertical alignment with the parison mold, said bottom mold being located between the finishing mold and the edge of the carriage, and means operating in response to the rotation of said carriage for moving the bottom mold into and out of engagement with the parison mold.

6. Apparatus for forming articles of glassware which comprises a continuously rotating carriage, a suction parison mold and associated blow mold mounted thereon, a neck ring and a suction and blow head associated with said parison mold, and a blow head associated with said blow mold, means for projecting the parison mold, neck ring, suction and blow head to a position adjacent a bath of glass to gather a charge of glass in the parison mold and neck ring, means for moving the parison mold, neck ring and suction and blow head to a parison forming position, means operative at such position to cooperate with the parison mold for supporting the charge for blowing, means for blowing the charge at such position to form a parison, means for opening the parison mold, means for closing the blow mold about the parison, means for opening the neck ring and moving it away from the blow mold, means for moving the blow head into capping relation with the blow mold and for applying blowing pressure therethrough to blow the parison to final form, and means for timing the several operations so that a charge is being both gathered and blown in the parison mold while a preceding charge is being blown to final form in the associated mold.

7. A suction gathering glass forming machine comprising a continuously rotated support, a parison forming unit including a suction gathering parison mold and neck mold mounted on said support, a cooperating blow mold also mounted on said support, means for introducing a charge of glass into the parison mold and neck mold, means for applying air through the neck mold to the charge and for simultaneously supporting the charge in the parison mold to form a parison therein, means for mounting one of said molds on the support including a carrier mounted for oscillation on the support about a vertical pivot, means for moving said mold and its carrier about said pivot to bring into axial alignment the neck mold and the blow mold while the parison is supported in the neck mold and for thereafter moving the said mold about the pivot out of such axial alignment, means for opening the neck mold to release the parison to the blow mold while the neck mold and blow mold are in axial alignment, a blow head positioned for engagement with the blow mold when the neck mold is out of alignment therewith, and means for engaging the blow head directly with the blow mold whereby the parison may be blown to final form while a second parison is being blown in the neck mold and parison mold.

ROBERT W. CANFIELD.